(12) United States Patent
Ciereniewicz et al.

(10) Patent No.: US 12,503,951 B2
(45) Date of Patent: Dec. 23, 2025

(54) AIRCRAFT ENGINE ROTARY LABYRINTH SEAL FOR USE IN A GEARBOX OF AN AIRCRAFT ENGINE OIL SYSTEM

(71) Applicant: Pratt & Whitney Canada Corp., Québec (CA)

(72) Inventors: Piotr Ciereniewicz, Rzeszów (PL); Sławomir Karbowiak, Zduńska Wola (PL)

(*) Notice: Subject to any disclaimer, the term of this patent is extended or adjusted under 35 U.S.C. 154(b) by 0 days.

(21) Appl. No.: 18/735,674

(22) Filed: Jun. 6, 2024

(65) Prior Publication Data
US 2025/0376929 A1     Dec. 11, 2025

(51) Int. Cl.
F01D 11/02     (2006.01)
F01D 25/18     (2006.01)

(52) U.S. Cl.
CPC ............ *F01D 11/02* (2013.01); *F01D 25/183* (2013.01); *F05D 2240/55* (2013.01)

(58) Field of Classification Search
CPC ......... F01D 11/02; F01D 25/183; F16J 15/44; F16J 15/447; F16J 15/4472; F16J 15/4453; F05D 2240/55; F05D 2230/60; F05D 2230/80; F05D 2260/4031; F05D 2260/40311
See application file for complete search history.

(56) References Cited

U.S. PATENT DOCUMENTS

| | | | |
|---|---|---|---|
| 3,241,842 A * | 3/1966 | Schweiger | F16J 15/3404 277/930 |
| 4,924,581 A | 5/1990 | Jakobsen | |
| 5,224,713 A * | 7/1993 | Pope | F01D 11/04 277/423 |
| 6,783,642 B2 | 8/2004 | Gueldry et al. | |
| 7,997,858 B2 | 8/2011 | Mikulec | |
| 9,249,887 B2 | 2/2016 | Seib et al. | |
| 2003/0082049 A1* | 5/2003 | Brisson | F01D 11/02 415/231 |

(Continued)

FOREIGN PATENT DOCUMENTS

DE     2604171 A1     8/1977

OTHER PUBLICATIONS

Search Report issued in European Patent Application No. 25181352.3; Date of Mailing Oct. 17, 2025 (8 pages).

*Primary Examiner* — Elton K Wong
(74) *Attorney, Agent, or Firm* — CANTOR COLBURN LLP

(57) ABSTRACT

An aircraft engine rotary labyrinth seal assembly is provided for use in a gearbox of an aircraft engine oil system. The aircraft engine rotary labyrinth seal includes a stationary part defining an opening, a rotatable part, which is rotatable relative to the stationary part within the opening, a seal base and a labyrinth seal fin member. The seal base is affixable to and rotatable with the rotatable part. The seal base includes an exterior facing annular mating portion. The labyrinth seal fin member is rotatable with the seal base and includes an interior facing annular mating portion attachable to the exterior facing annular mating portion and an exterior facing annular labyrinth seal. The exterior facing annular labyrinth seal includes multiple prongs configured to cooperatively form a rotary labyrinth seal with the stationary part.

20 Claims, 7 Drawing Sheets

(56) References Cited

U.S. PATENT DOCUMENTS

| | | | |
|---|---|---|---|
| 2015/0097342 A1* | 4/2015 | Morreale | F16J 15/164 |
| | | | 277/412 |
| 2018/0355880 A1 | 12/2018 | Urushidani | |
| 2019/0153884 A1* | 5/2019 | MirzaMoghadam | F01D 11/02 |
| 2019/0257214 A1 | 8/2019 | Pankratov et al. | |
| 2023/0019443 A1 | 1/2023 | Rizzo et al. | |

* cited by examiner

1400

1401 Forming seal base to include interior facing annular mating potion

1402 Affixing seal base to gearbox housing defining opening

1403 Forming labyrinth seal fin member to include exterior facing annular mating portion and interior facing annular labyrinth seal including multiple prongs

1404 Attaching exterior facing annular mating portion to interior facing annular mating portion

1405 Disposing rotatable shaft for rotation within opening whereby multiple prongs cooperatively form stationary labyrinth seal with rotatable shaft

FIG. 14

AIRCRAFT ENGINE ROTARY LABYRINTH SEAL FOR USE IN A GEARBOX OF AN AIRCRAFT ENGINE OIL SYSTEM

BACKGROUND

The present disclosure relates to aircraft engine oil systems and, more particularly, to an aircraft engine oil system with an aircraft engine rotary labyrinth seal.

Contact seals are commonly used to provide a fluid seal around a rotating shaft. This is particularly useful in high-speed rotating shafts used in high temperature environments, such as in gas turbine engines of aircrafts and in aircraft engine oil systems. Contact seals often include ring segments and a runner that abut one another and rotate relative to one other to form a rubbing, contact interface. This rubbing, contact interface creates a fluid seal around the shaft.

BRIEF DESCRIPTION

According to an aspect of the disclosure, an aircraft engine rotary labyrinth seal assembly is provided for use in a gearbox of an aircraft engine oil system. The aircraft engine rotary labyrinth seal includes a stationary part defining an opening, a rotatable part, which is rotatable relative to the stationary part within the opening, a seal base and a labyrinth seal fin member. The seal base is affixable to and rotatable with the rotatable part. The seal base includes an exterior facing annular mating portion. The labyrinth seal fin member is rotatable with the seal base and includes an interior facing annular mating portion attachable to the exterior facing annular mating portion and an exterior facing annular labyrinth seal. The exterior facing annular labyrinth seal includes multiple prongs configured to cooperatively form a rotary labyrinth seal with the stationary part.

In accordance with additional or alternative embodiments, the stationary part includes an outer housing and a mating insert affixable to the outer housing and defining the opening and the rotatable part includes a central shaft, an annular flange extending radially outwardly from the central shaft and forming a shoulder on which an inboard portion of the seal base is disposable and a nut, which is threadably engageable with the central shaft to drive the inboard portion of the seal base toward abutment with the shoulder and to thereby secure a position of the seal base.

In accordance with additional or alternative embodiments, the seal base and the labyrinth seal fin member are formed of different materials.

In accordance with additional or alternative embodiments, the interior facing annular mating portion and the exterior facing annular mating portion are opposed surfaces and the interior facing annular mating portion is attachable to the exterior facing annular mating portion via a tight fit attachment of the opposed surfaces.

In accordance with additional or alternative embodiments, the interior facing annular mating portion and the exterior facing annular mating portion are opposed surfaces and the interior facing annular mating portion is attachable to the exterior facing annular mating portion via a weld of the opposed surfaces.

In accordance with additional or alternative embodiments, the interior facing annular mating portion and the exterior facing annular mating portion are opposed surfaces and the interior facing annular mating portion is attachable to the exterior facing annular mating portion via an adhesive interposed between the opposed surfaces.

In accordance with additional or alternative embodiments, the interior facing annular mating portion and the exterior facing annular mating portion form a shiplap joint and the interior facing annular mating portion is attachable to the exterior facing annular mating portion via a bolt through the shiplap joint.

In accordance with additional or alternative embodiments, the interior facing annular mating portion and the exterior facing annular mating portion form a shiplap joint and the interior facing annular mating portion is attachable to the exterior facing annular mating portion via a rivet through the shiplap joint.

According to an aspect of the disclosure, an aircraft engine rotary labyrinth seal assembly of a gearbox of an aircraft engine oil system is provided and includes a gearbox housing defining an opening, a rotatable shaft, which is rotatable about a central longitudinal axis thereof relative to the gearbox housing within the opening, a seal base and a labyrinth seal fin member. The seal base is affixable to and rotatable with the rotatable shaft. The seal base includes an exterior facing annular mating portion. The labyrinth seal fin member is rotatable with the seal base and includes an interior facing annular mating portion attachable to the exterior facing annular mating portion and an exterior facing annular labyrinth seal including multiple prongs configured to cooperatively form a rotary labyrinth seal with the gearbox housing.

In accordance with additional or alternative embodiments, the gearbox housing includes an outer housing and a mating insert affixable to the outer housing and defining the opening and the rotatable shaft includes a central shaft which extends longitudinally along the central longitudinal axis thereof, an annular flange extending radially outwardly from the central shaft and forming a shoulder on which an inboard portion of the seal base is disposable and a nut, which is threadably engageable with threading of the central shaft to drive the inboard portion of the seal base toward abutment with the shoulder and to thereby secure a position of the seal base.

In accordance with additional or alternative embodiments, the seal base and the labyrinth seal fin member are formed of different materials.

In accordance with additional or alternative embodiments, the interior facing annular mating portion and the exterior facing annular mating portion are opposed surfaces and the interior facing annular mating portion is attachable to the exterior facing annular mating portion via a tight fit attachment of the opposed surfaces.

In accordance with additional or alternative embodiments, the interior facing annular mating portion and the exterior facing annular mating portion are opposed surfaces and the interior facing annular mating portion is attachable to the exterior facing annular mating portion via a weld of the opposed surfaces.

In accordance with additional or alternative embodiments, the interior facing annular mating portion and the exterior facing annular mating portion are opposed surfaces and the interior facing annular mating portion is attachable to the exterior facing annular mating portion via an adhesive interposed between the opposed surfaces.

In accordance with additional or alternative embodiments, the interior facing annular mating portion and the exterior facing annular mating portion form a shiplap joint and the interior facing annular mating portion is attachable to the exterior facing annular mating portion via a bolt through the shiplap joint.

In accordance with additional or alternative embodiments, the interior facing annular mating portion and the exterior facing annular mating portion form a shiplap joint and the interior facing annular mating portion is attachable to the exterior facing annular mating portion via a rivet through the shiplap joint.

According to an aspect of the disclosure, a method of assembling an aircraft engine rotary labyrinth seal assembly of a gearbox of an aircraft engine oil system is provided. The method includes forming a seal base to include an exterior facing annular mating portion, affixing the seal base to a rotatable shaft, which is rotatable about a central longitudinal axis thereof within an opening of a gearbox housing, forming a labyrinth seal fin member to include an interior facing annular mating portion and an exterior facing annular labyrinth seal including multiple prongs, attaching the interior facing annular mating portion to the exterior facing annular mating portion and disposing the rotatable shaft, the seal base and the labyrinth seal fin member for rotation within the opening whereby the multiple prongs cooperatively form a rotary labyrinth seal with the gearbox housing.

In accordance with additional or alternative embodiments, the seal base and the labyrinth seal fin member are formed of different materials.

In accordance with additional or alternative embodiments, the interior facing annular mating portion and the exterior facing annular mating portion are opposed surfaces and the attaching includes one or more of press-fitting, welding and gluing the opposed surfaces.

In accordance with additional or alternative embodiments, the interior facing annular mating portion and the exterior facing annular mating portion form a shiplap joint and the attaching includes one or more of bolting and riveting through the shiplap joint.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts:

FIG. 14 is a flow diagram illustrating a method of assembling an aircraft engine stationary labyrinth seal assembly of a gearbox of an aircraft engine oil system in accordance with embodiments.

DETAILED DESCRIPTION

An engine oil system of an aircraft can be a complex arrangement of various components and parts. Pressure control in such systems is often a difficult task that can be realized through the use of various solutions, including seals. A labyrinth seal is type of seal with many grooves or fins that help prevent leakage of pressurized fluid. Fins of a labyrinth seal may be located on a rotating element (i.e., a shaft), on a stator surrounding the rotating element or on both in an interlocking configuration. A difficulty with labyrinth seals is that a very tight clearance must typically exist between the fins of a labyrinth seal and a running surface and this clearance is often difficult to control due to material properties, machining possibilities and operating conditions.

Thus, as will be described below, an aircraft engine rotatory or stationary labyrinth seal with attachable fins/teeth (hereinafter referred to as "fins") is provided for use in a gearbox of an engine oil system of an aircraft.

The aircraft engine rotatory labyrinth seal provides options for using different materials for the base of the seal and for the fins to thereby control clearances to mating portions more precisely than what is possible with conventional seals. Attachment of the fins to the base of the seal can be achieved through labyrinth fins being press fitted into the base (tight fit, friction), through labyrinth fins being welded to the base, through labyrinth fins being glued to the base, through labyrinth fins being bolted to the base (interchangeable) and through labyrinth fins being riveted to the base.

The aircraft engine stationary labyrinth seal provides options for using different materials for the base of the seal and for the fins to thereby control clearances to mating portions more precisely than what is possible with conventional seals. Attachment of the fins to the base of the seal can be achieved through labyrinth fins being press fitted into the base (tight fit, friction), through labyrinth fins being welded to the base, through labyrinth fins being glued to the base, through labyrinth fins being bolted to the base (interchangeable) and through labyrinth fins being riveted to the base.

Figure 1:
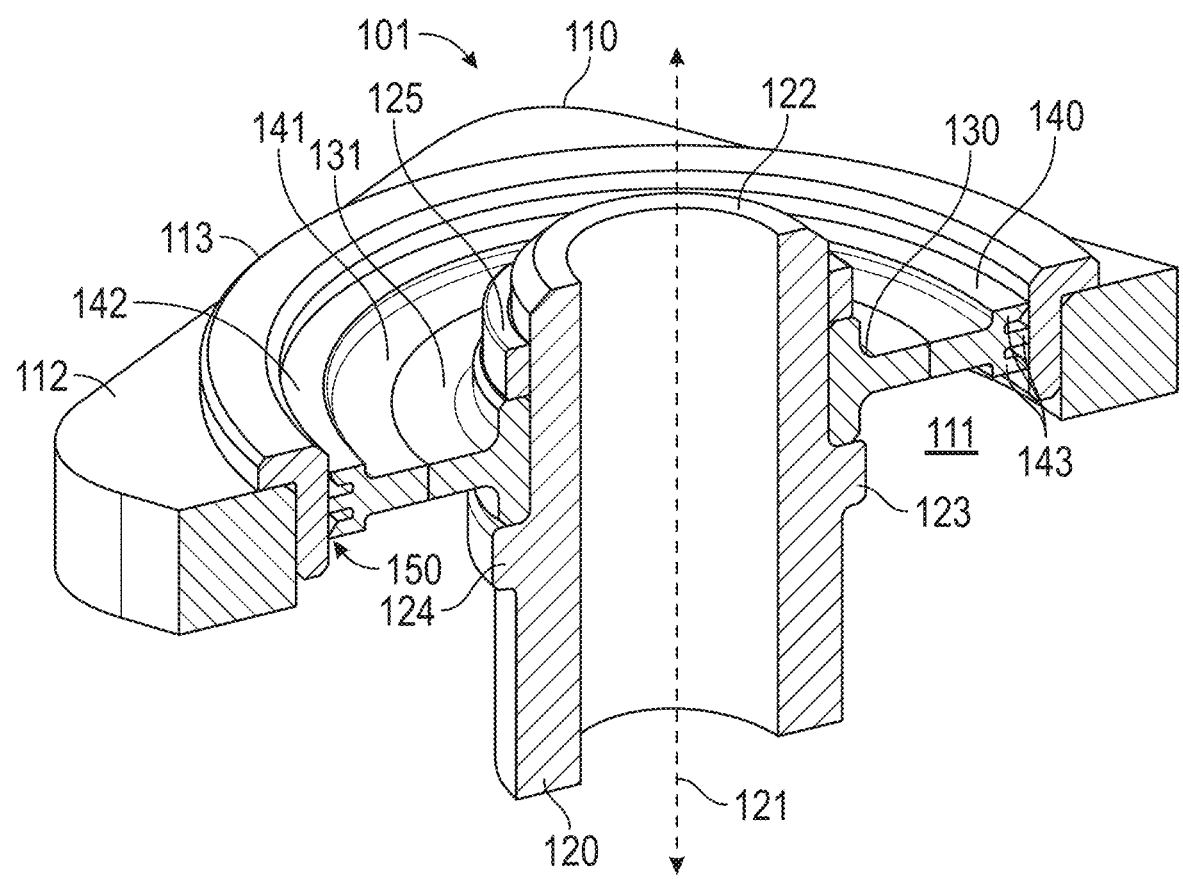
FIG. 1 is a perspective view of an aircraft engine rotary labyrinth seal for use in a gearbox of an aircraft engine oil system in accordance with embodiments.

With reference to FIG. 1 and with additional reference to FIGS. 2-6, an aircraft engine rotary labyrinth seal assembly 101 is provided for use in or with, for example, a gearbox of an aircraft engine oil system. The aircraft engine rotary labyrinth seal assembly 101 includes a stationary part or gearbox housing (hereinafter referred to as a "gearbox housing") 110 that is formed to define an opening 111 and includes an outer housing 112 and a mating insert 113 defining the opening 111, a rotatable part or rotatable shaft (hereinafter referred to as a "rotatable shaft") 120, a seal base 130 that is affixable to and rotatable with the rotatable shaft 120 and a labyrinth seal fin member 140. The rotatable shaft 120 is rotatable about a central longitudinal axis 121 thereof relative to the gearbox housing 110 within the opening 111. The rotatable shaft 120 includes a central shaft 122 which extends longitudinally along the central longitudinal axis 121 thereof, an annular flange 123 extending radially outwardly from the central shaft 122 and forming a shoulder 124 on which an inboard portion of the seal base 130 is disposable and a nut 125. The nut 125 is threadably engageable with threading of the central shaft 122 to drive the inboard portion of the seal base 130 toward abutment with the shoulder 124 and to thereby secure a position of the seal base 130 along the central shaft 122. The seal base 130 includes an exterior facing annular mating portion 131. The labyrinth seal fin member 140 is rotatable with the seal base 130 and includes an interior facing annular mating portion 141, which is attachable to the exterior facing annular mating portion 131, and an exterior facing annular labyrinth seal 142. The exterior facing annular labyrinth seal 142 includes multiple prongs 143 that are configured to cooperatively form a rotary labyrinth seal 150 with the gearbox housing 110.

In accordance with embodiments, the seal base 130 and the labyrinth seal fin member 140 can be formed of different materials. For example, the seal base 130 can be formed of metallic materials or alloys thereof (i.e., steel, aluminum) and the labyrinth seal fin member 140 can be formed of polymeric materials (i.e., polyimide). The different materials of the seal base 130 and the labyrinth seal fin member 140 can contribute to improved clearances of the rotary labyrinth seal assembly 101 and to making repair or replacement of parts easier.

Figure 2:
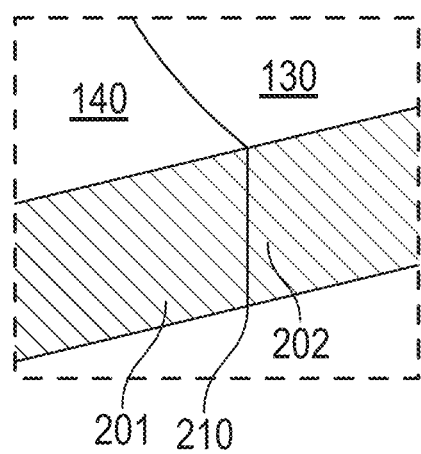
FIG. 2 is a perspective view of a tight fit of opposed surfaces of the rotary labyrinth seal of FIG. 1 in accordance with embodiments.
Figure 3:
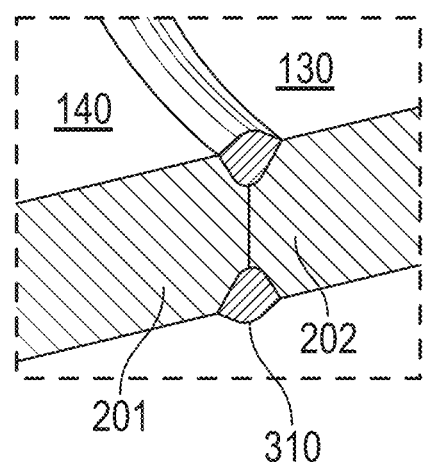
FIG. 3 is a perspective view of a weld of opposed surfaces of the rotary labyrinth seal of FIG. 1 in accordance with embodiments.
Figure 4:
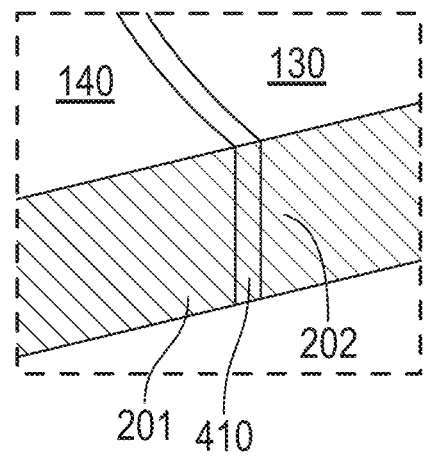
FIG. 4 is a perspective view of an adhesive of opposed surfaces of the rotary labyrinth seal of FIG. 1 in accordance with embodiments.

As shown in FIGS. 2-4, the interior facing annular mating portion 141 and the exterior facing annular mating portion 131 can be provided as opposed surfaces 201 and 202, respectively. In these or other cases, the interior facing annular mating portion 141 can be attachable to the exterior facing annular mating portion 131 via one or more of a tight fit attachment 210 of the opposed surfaces 201 and 202 (see FIG. 2), a weld 310 of the opposed surfaces 201 and 202 (see FIG. 3) and a glue or an adhesive 410 interposed between the opposed surfaces 201 and 202 (see FIG. 4).

Figure 5:
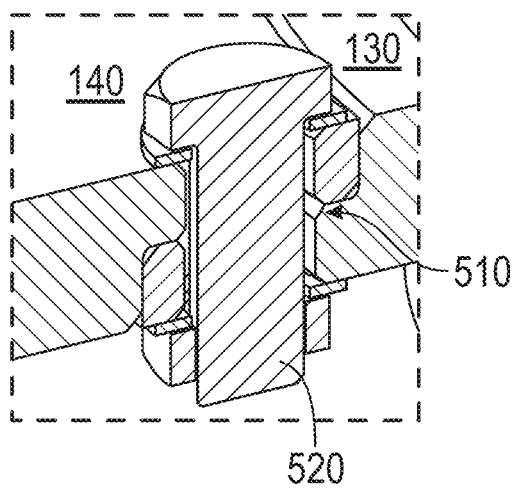
FIG. 5 is a perspective view of a bolt through a shiplap joint of the rotary labyrinth seal of FIG. 1 in accordance with embodiments.
Figure 6:
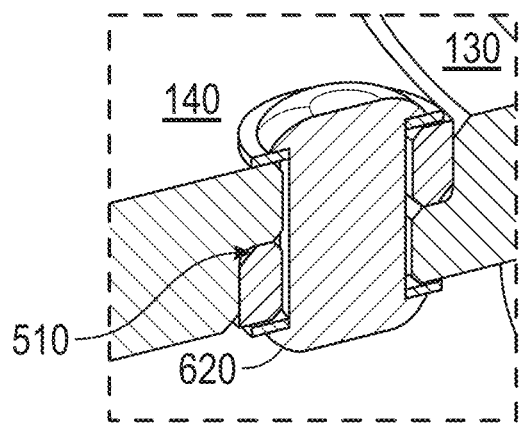
FIG. 6 is a perspective view of a rivet through a shiplap joint of the rotary labyrinth seal of FIG. 1 in accordance with embodiments.

As shown in FIGS. 5 and 6, the interior facing annular mating portion 141 and the exterior facing annular mating portion 131 can form a shiplap joint 510. In these or other cases, the interior facing annular mating portion 141 can be attachable to the exterior facing annular mating portion 131 via one or more of a bolt 520 through the shiplap joint 510 (see FIG. 5) and a rivet 620 through the shiplap joint 510 (see FIG. 6).

Figure 7:
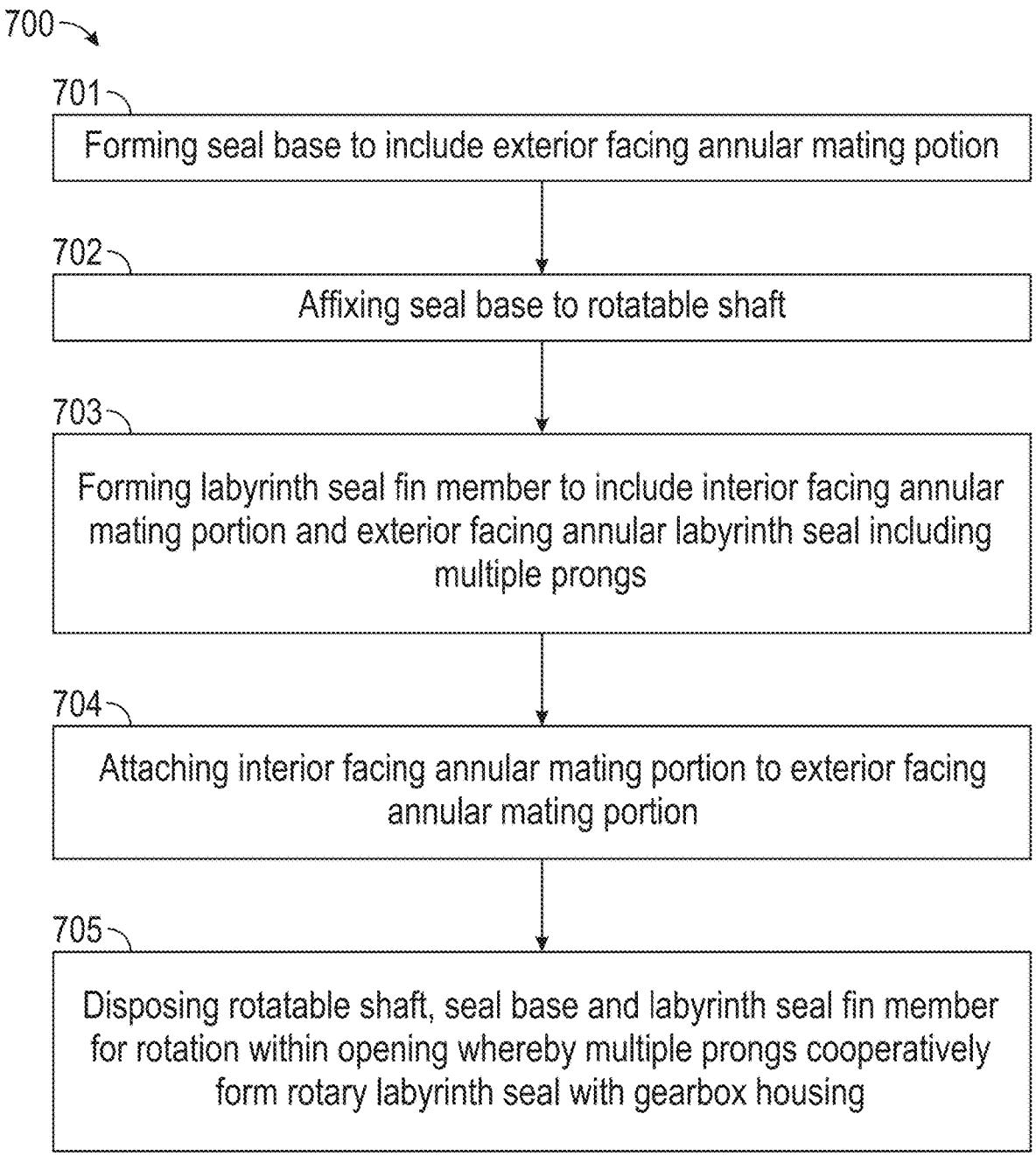
FIG. 7 is a flow diagram illustrating a method of assembling an aircraft engine rotary labyrinth seal assembly of a gearbox of an aircraft engine oil system in accordance with embodiments.

With reference to FIG. 7, a method 700 of assembling an aircraft engine rotary labyrinth seal assembly, such as the aircraft engine rotary labyrinth seal assembly 101 described above, is provided. The method 700 includes forming a seal base to include an exterior facing annular mating portion (block 701), affixing the seal base to a rotatable shaft, which is rotatable about a central longitudinal axis thereof within an opening of a gearbox housing (block 702), forming a labyrinth seal fin member to include an interior facing annular mating portion and an exterior facing annular labyrinth seal including multiple prongs (block 703), attaching the interior facing annular mating portion to the exterior facing annular mating portion (block 704) and disposing the rotatable shaft, the seal base and the labyrinth seal fin member for rotation within the opening whereby the multiple prongs cooperatively form a rotary labyrinth seal with the gearbox housing (block 705). As above, the seal base and the labyrinth seal fin member can be formed of different materials. Also, the interior facing annular mating portion and the exterior facing annular mating portion can be provided as opposed surfaces and, in these or other cases, the attaching of block 704 can include one or more of press-fitting, welding and gluing the opposed surfaces. Alternatively, the interior facing annular mating portion and the exterior facing annular mating portion can form a shiplap joint and, in these or other cases, the attaching of block 704 can include one or more of bolting and riveting through the shiplap joint.

Figure 8:
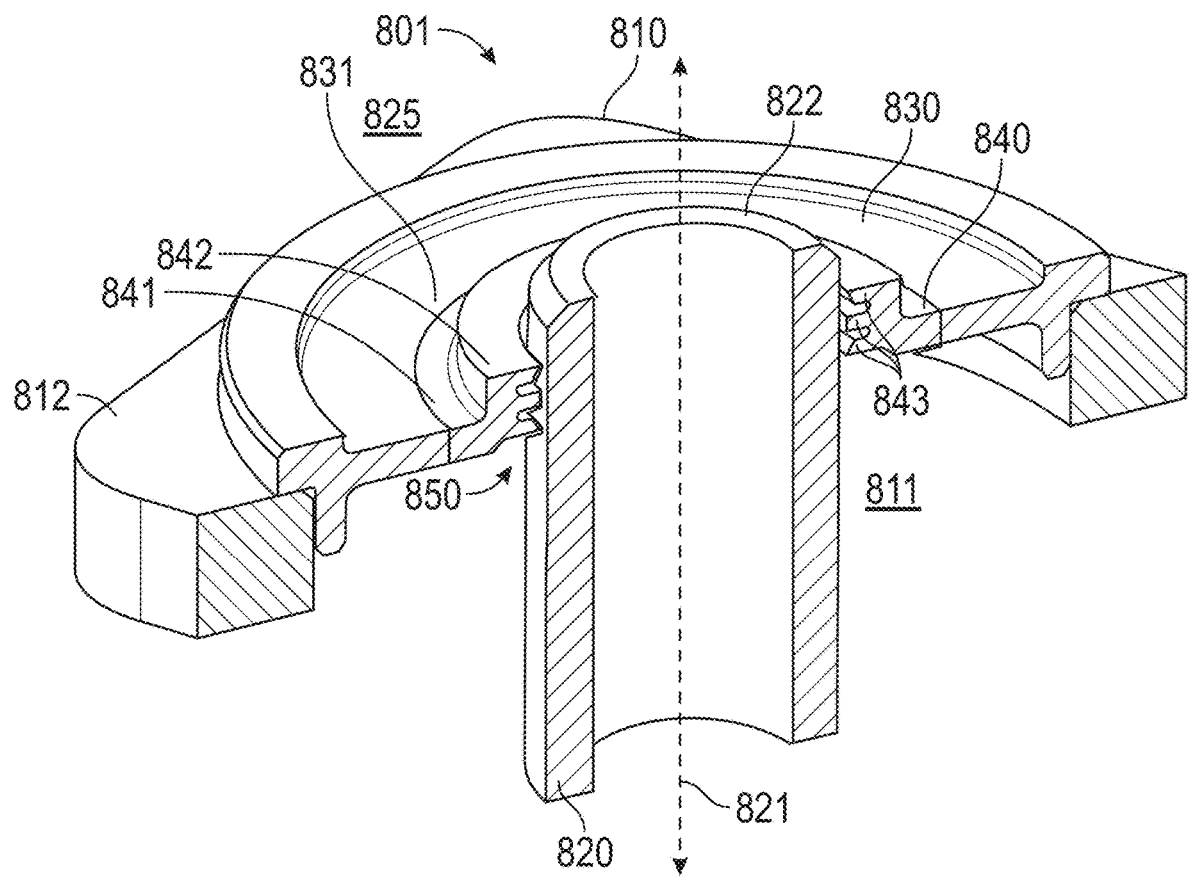
FIG. 8 is a perspective view of an aircraft engine stationary labyrinth seal for use in a gearbox of an aircraft engine oil system in accordance with embodiments.

With reference to FIG. 8 and with additional reference to FIGS. 9-13, an aircraft engine stationary labyrinth seal assembly 801 is provided for use in or with, for example, a gearbox of an aircraft engine oil system. The aircraft engine stationary labyrinth seal assembly 801 includes a stationary part or gearbox housing (hereinafter referred to as a "gearbox housing") 810 that is formed to define an opening 811 and includes an outer housing 812, a rotatable part or rotatable shaft (hereinafter referred to as a "rotatable shaft") 820, a seal base 830 that is affixable to the gearbox housing 810 and a labyrinth seal fin member 840. The rotatable shaft 820 is rotatable about a central longitudinal axis 821 thereof relative to the gearbox housing 810 within the opening 811. The rotatable shaft 820 includes a central shaft 822 that extends longitudinally along the central longitudinal axis 821 thereof. The seal base 830 includes an interior facing annular mating portion 831. The labyrinth seal fin member 840 includes an exterior facing annular mating portion 841, which is attachable to the interior facing annular mating portion 831, and an interior facing annular labyrinth seal 842. The interior facing annular labyrinth seal 842 includes multiple prongs 843 that are configured to cooperatively form a stationary labyrinth seal 850 with the rotatable shaft 820.

In accordance with embodiments, the seal base 830 and the labyrinth seal fin member 840 can be formed of different materials. For example, the seal base 830 can be formed of metallic materials or alloys thereof (i.e., steel, aluminum) and the labyrinth seal fin member 840 can be formed of polymeric materials (i.e., polyimide). The different materials of the seal base 830 and the labyrinth seal fin member 840 can contribute to improved clearances of the stationary labyrinth seal assembly 801 and to making repair or replacement of parts easier.

Figure 9:
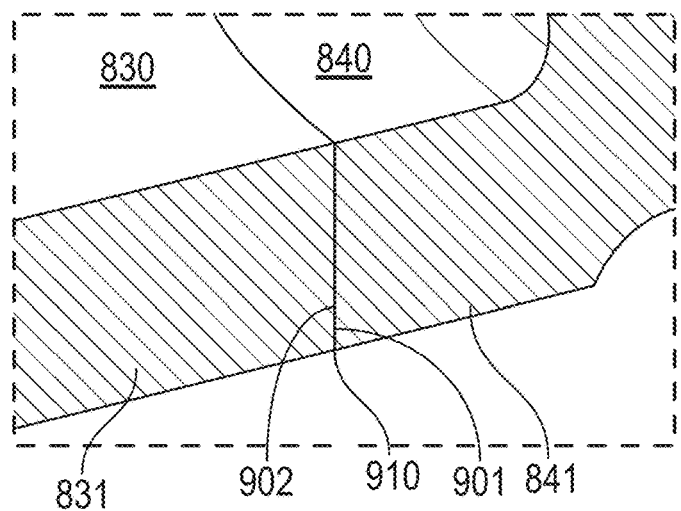
FIG. 9 is a perspective view of a tight fit of opposed surfaces of the stationary labyrinth seal of FIG. 8 in accordance with embodiments.
Figure 10:
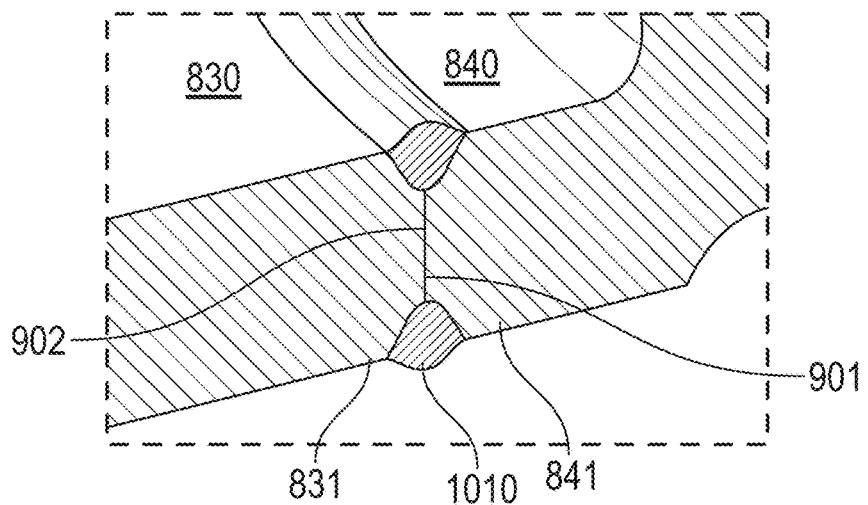
FIG. 10 is a perspective view of a weld of opposed surfaces of the stationary labyrinth seal of FIG. 8 in accordance with embodiments.
Figure 11:
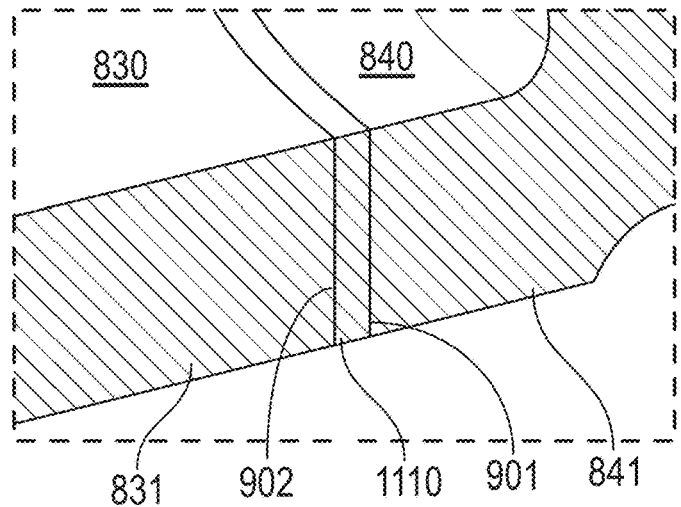
FIG. 11 is a perspective view of an adhesive of opposed surfaces of the stationary labyrinth seal of FIG. 8 in accordance with embodiments.

As shown in FIGS. 9-11, the exterior facing annular mating portion 841 and the interior facing annular mating portion 831 can be provided as opposed surfaces 901 and 902, respectively. In these or other cases, the exterior facing annular mating portion 841 can be attachable to the interior facing annular mating portion 831 via one or more of a tight fit attachment 910 of the opposed surfaces 901 and 902 (see FIG. 9), a weld 1010 of the opposed surfaces 901 and 902 (see FIG. 10) and an adhesive 1110 interposed between the opposed surfaces 901 and 902 (see FIG. 11).

Figure 12:
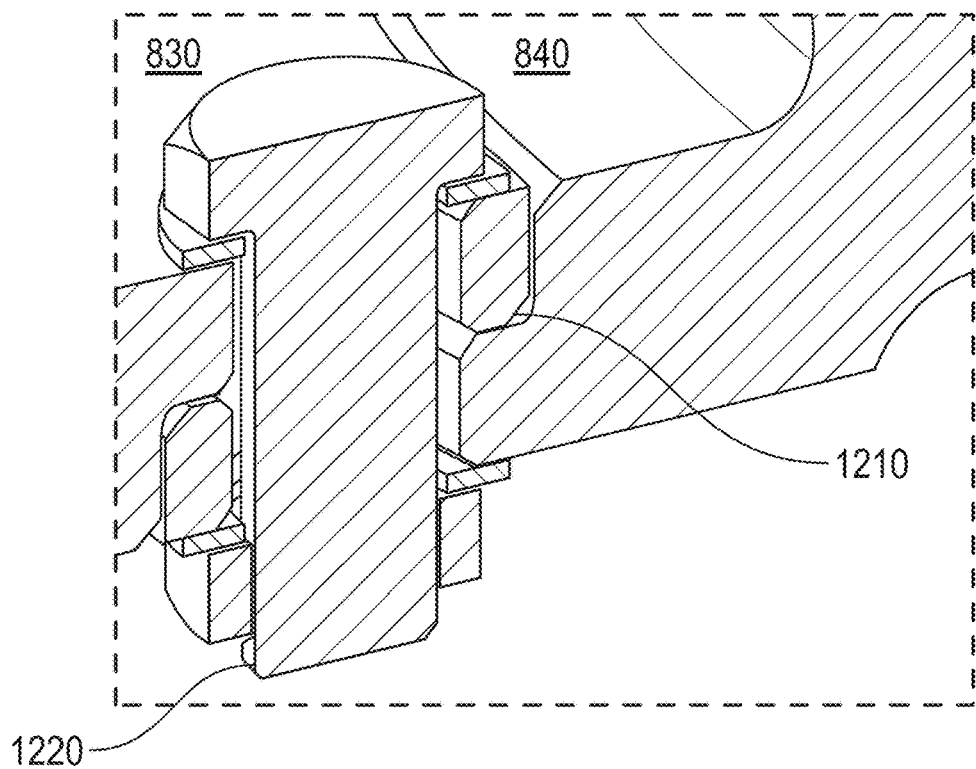
FIG. 12 is a perspective view of a bolt through a shiplap joint of the stationary labyrinth seal of FIG. 8 in accordance with embodiments.
Figure 13:
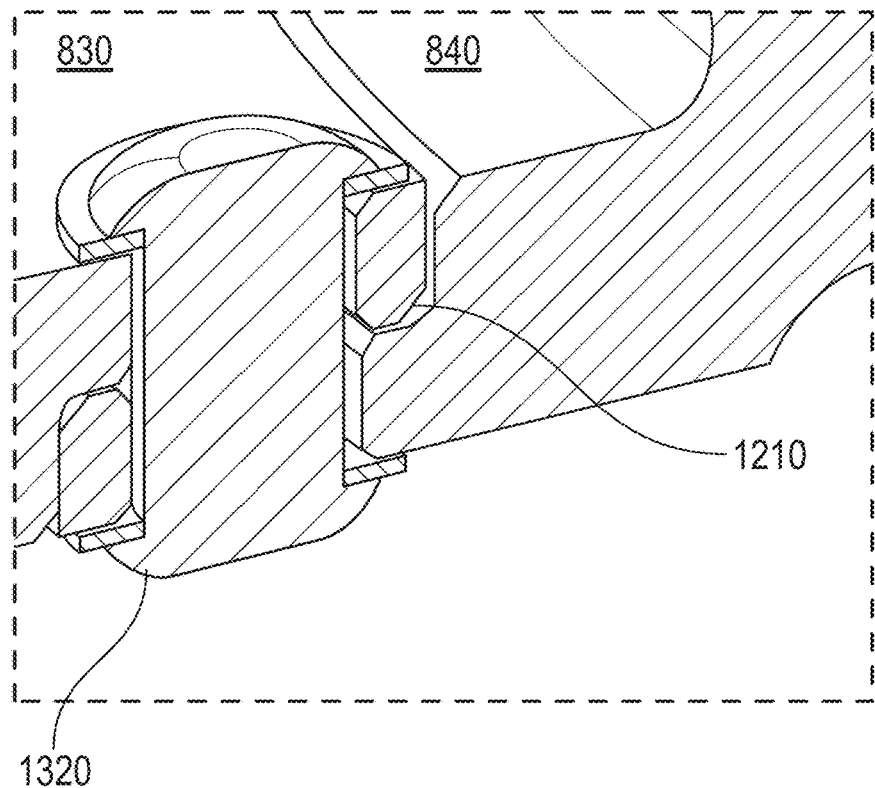
FIG. 13 is a perspective view of a rivet through a shiplap joint of the stationary labyrinth seal of FIG. 8 in accordance with embodiments.

As shown in FIGS. 12 and 13, the exterior facing annular mating portion 841 and the interior facing annular mating portion 831 can form a shiplap joint 1210. In these or other cases, the exterior facing annular mating portion 841 can be attachable to the interior facing annular mating portion 831 via one or more of a bolt 1220 through the shiplap joint 1210 (see FIG. 12) and a rivet 1320 through the shiplap joint 1210 (see FIG. 13).

With reference to FIG. 14, a method 1400 of assembling an aircraft engine stationary labyrinth seal assembly, such as the aircraft engine stationary labyrinth seal assembly 801 described above, is provided. The method 1400 includes forming a seal base to include an interior facing annular mating portion (block 1401), affixing the seal base to gearbox housing defining an opening (block 1402), forming a labyrinth seal fin member to include an exterior facing annular mating portion and an interior facing annular labyrinth seal including multiple prongs (block 1403), attaching the exterior facing annular mating portion to the interior facing annular mating portion (block 1404) and disposing the rotatable shaft for rotation within the opening whereby the multiple prongs cooperatively form a stationary labyrinth seal with the rotatable shaft (block 1405). As above, the seal base and the labyrinth seal fin member can be formed of different materials. Also, the exterior facing annular mating portion and the interior facing annular mating portion can be provided as opposed surfaces and, in these or other cases, the attaching of block 1404 can include one or more of press-fitting, welding and gluing the opposed surfaces. Alternatively, the exterior facing annular mating portion and the interior facing annular mating portion can form a shiplap joint and, in these or other cases, the attaching of block 1404 can include one or more of bolting and riveting through the shiplap joint.

Technical effects and benefits of the present disclosure are the provision of an aircraft engine rotary or stationary labyrinth seal that allows for the use of different materials for the fins and the base to thereby improve clearance control and structural integrity. Also, replacement of the fins due to wear will not require replacement of the base or other similar disassembly operations.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. An aircraft engine rotary labyrinth seal assembly for use in a gearbox of an aircraft engine oil system, the aircraft engine rotary labyrinth seal comprising:
    a stationary part defining an opening;
    a rotatable part, which is rotatable relative to the stationary part within the opening;
    a seal base affixable to and rotatable with the rotatable part and comprising an exterior facing annular mating portion; and
    a labyrinth seal fin member rotatable with the seal base and comprising:
        an interior facing annular mating portion attachable to the exterior facing annular mating portion; and
        an exterior facing annular labyrinth seal comprising multiple prongs configured to cooperatively form a rotary labyrinth seal with the stationary part.

2. The aircraft engine rotary labyrinth seal assembly according to claim 1, wherein:
    the stationary part comprises an outer housing and a mating insert affixable to the outer housing and defining the opening, and
    the rotatable part comprises a central shaft, an annular flange extending radially outwardly from the central shaft and forming a shoulder on which an inboard portion of the seal base is disposable and a nut, which is threadably engageable with the central shaft to drive the inboard portion of the seal base toward abutment with the shoulder and to thereby secure a position of the seal base.

3. The aircraft engine rotary labyrinth seal assembly according to claim 1, wherein the seal base and the labyrinth seal fin member are formed of different materials.

4. The aircraft engine rotary labyrinth seal assembly according to claim 1, wherein:
    the interior facing annular mating portion and the exterior facing annular mating portion are opposed surfaces, and
    the interior facing annular mating portion is attachable to the exterior facing annular mating portion via a tight fit attachment of the opposed surfaces.

5. The aircraft engine rotary labyrinth seal assembly according to claim 1, wherein:
    the interior facing annular mating portion and the exterior facing annular mating portion are opposed surfaces, and
    the interior facing annular mating portion is attachable to the exterior facing annular mating portion via a weld of the opposed surfaces.

6. The aircraft engine rotary labyrinth seal assembly according to claim 1, wherein:
    the interior facing annular mating portion and the exterior facing annular mating portion are opposed surfaces, and
    the interior facing annular mating portion is attachable to the exterior facing annular mating portion via an adhesive interposed between the opposed surfaces.

7. The aircraft engine rotary labyrinth seal assembly according to claim 1, wherein:
    the interior facing annular mating portion and the exterior facing annular mating portion form a shiplap joint, and
    the interior facing annular mating portion is attachable to the exterior facing annular mating portion via a bolt through the shiplap joint.

8. The aircraft engine rotary labyrinth seal assembly according to claim 1, wherein:
    the interior facing annular mating portion and the exterior facing annular mating portion form a shiplap joint, and the interior facing annular mating portion is attachable to the exterior facing annular mating portion via a rivet through the shiplap joint.

9. An aircraft engine rotary labyrinth seal assembly of a gearbox of an aircraft engine oil system, the aircraft engine rotary labyrinth seal assembly comprising:
a gearbox housing defining an opening;
a rotatable shaft, which is rotatable about a central longitudinal axis thereof relative to the gearbox housing within the opening;
a seal base affixable to and rotatable with the rotatable shaft and comprising an exterior facing annular mating portion; and
a labyrinth seal fin member rotatable with the seal base and comprising:
an interior facing annular mating portion attachable to the exterior facing annular mating portion; and
an exterior facing annular labyrinth seal comprising multiple prongs configured to cooperatively form a rotary labyrinth seal with the gearbox housing.

10. The aircraft engine rotary labyrinth seal assembly according to claim 9, wherein:
the gearbox housing comprises an outer housing and a mating insert affixable to the outer housing and defining the opening, and
the rotatable shaft comprises a central shaft which extends longitudinally along the central longitudinal axis thereof, an annular flange extending radially outwardly from the central shaft and forming a shoulder on which an inboard portion of the seal base is disposable and a nut, which is threadably engageable with threading of the central shaft to drive the inboard portion of the seal base toward abutment with the shoulder and to thereby secure a position of the seal base.

11. The aircraft engine rotary labyrinth seal assembly according to claim 9, wherein the seal base and the labyrinth seal fin member are formed of different materials.

12. The aircraft engine rotary labyrinth seal assembly according to claim 9, wherein:
the interior facing annular mating portion and the exterior facing annular mating portion are opposed surfaces, and
the interior facing annular mating portion is attachable to the exterior facing annular mating portion via a tight fit attachment of the opposed surfaces.

13. The aircraft engine rotary labyrinth seal assembly according to claim 9, wherein:
the interior facing annular mating portion and the exterior facing annular mating portion are opposed surfaces, and
the interior facing annular mating portion is attachable to the exterior facing annular mating portion via a weld of the opposed surfaces.

14. The aircraft engine rotary labyrinth seal assembly according to claim 9, wherein:
the interior facing annular mating portion and the exterior facing annular mating portion are opposed surfaces, and
the interior facing annular mating portion is attachable to the exterior facing annular mating portion via an adhesive interposed between the opposed surfaces.

15. The aircraft engine rotary labyrinth seal assembly according to claim 9, wherein:
the interior facing annular mating portion and the exterior facing annular mating portion form a shiplap joint, and
the interior facing annular mating portion is attachable to the exterior facing annular mating portion via a bolt through the shiplap joint.

16. The aircraft engine rotary labyrinth seal assembly according to claim 9, wherein:
the interior facing annular mating portion and the exterior facing annular mating portion form a shiplap joint, and
the interior facing annular mating portion is attachable to the exterior facing annular mating portion via a rivet through the shiplap joint.

17. A method of assembling an aircraft engine rotary labyrinth seal assembly of a gearbox of an aircraft engine oil system, the method comprising:
forming a seal base to comprise an exterior facing annular mating portion;
affixing the seal base to a rotatable shaft, which is rotatable about a central longitudinal axis thereof within an opening of a gearbox housing;
forming a labyrinth seal fin member to comprise an interior facing annular mating portion and an exterior facing annular labyrinth seal comprising multiple prongs;
attaching the interior facing annular mating portion to the exterior facing annular mating portion; and
disposing the rotatable shaft, the seal base and the labyrinth seal fin member for rotation within the opening whereby the multiple prongs cooperatively form a rotary labyrinth seal with the gearbox housing.

18. The method according to claim 17, wherein the seal base and the labyrinth seal fin member are formed of different materials.

19. The method according to claim 17, wherein:
the interior facing annular mating portion and the exterior facing annular mating portion are opposed surfaces, and
the attaching comprises one or more of press-fitting, welding and gluing the opposed surfaces.

20. The method according to claim 17, wherein:
the interior facing annular mating portion and the exterior facing annular mating portion form a shiplap joint, and
the attaching comprises one or more of bolting and riveting through the shiplap joint.

* * * * *